Jan. 16, 1940.　　　C. W. DE MUND ET AL　　　2,187,019
EVAPORATIVE AIR COOLER
Filed Sept. 7, 1938　　　3 Sheets-Sheet 1
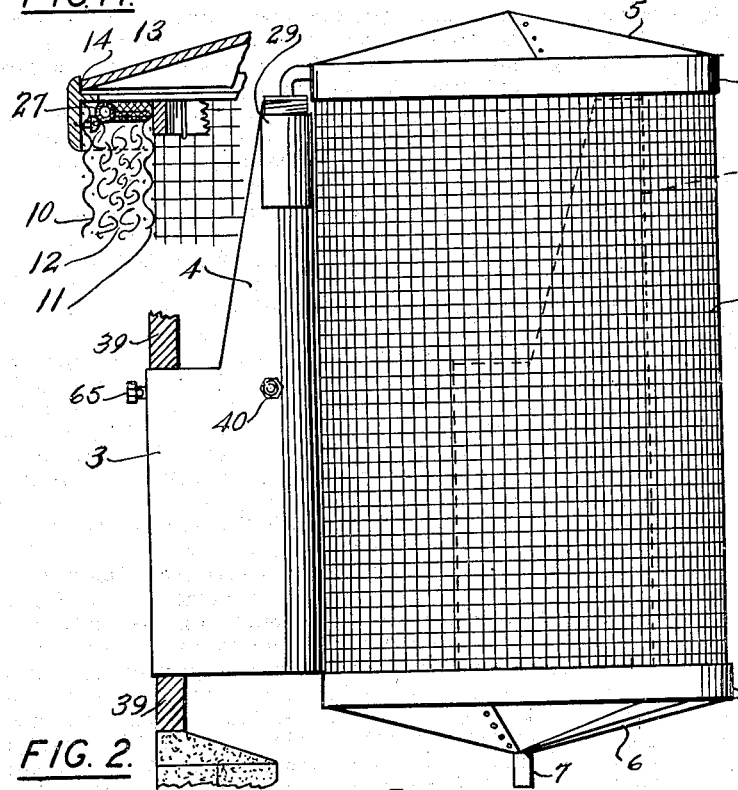
FIG. 11.
FIG. 2.
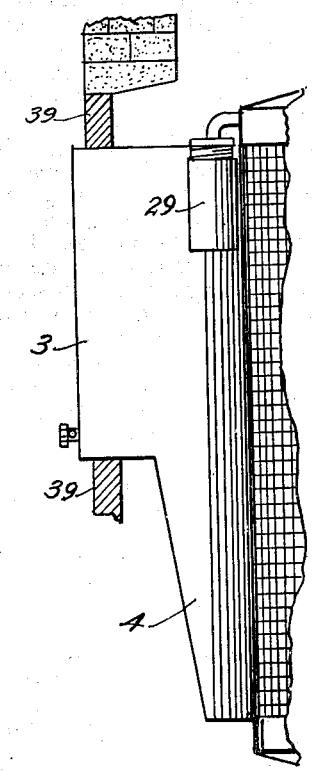
FIG. 4.
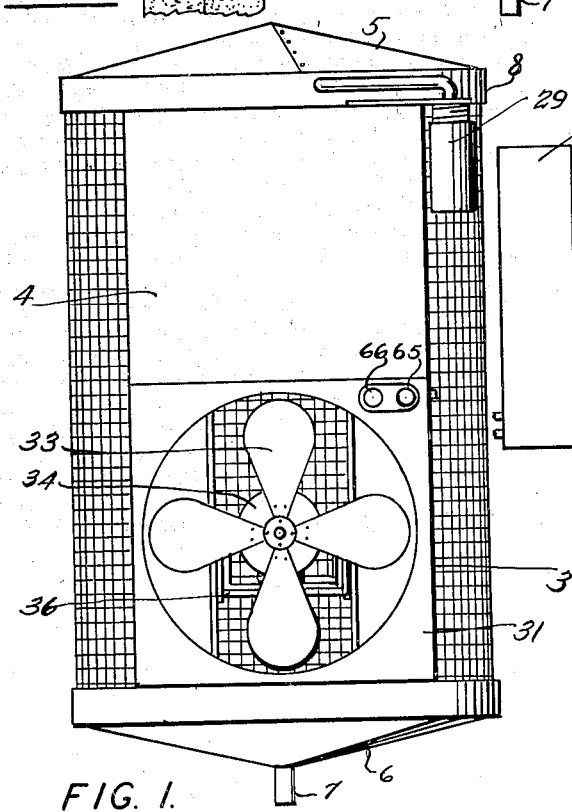
FIG. 1.
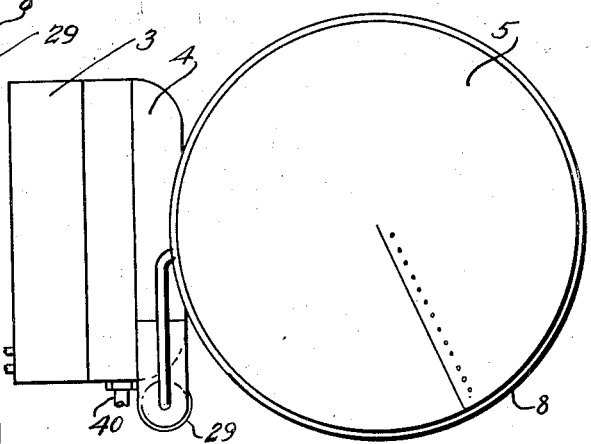
FIG. 3.
INVENTORS
Charles W. De Mund and
Lester A. De Mund
BY Scott L. Norvell
ATTORNEY

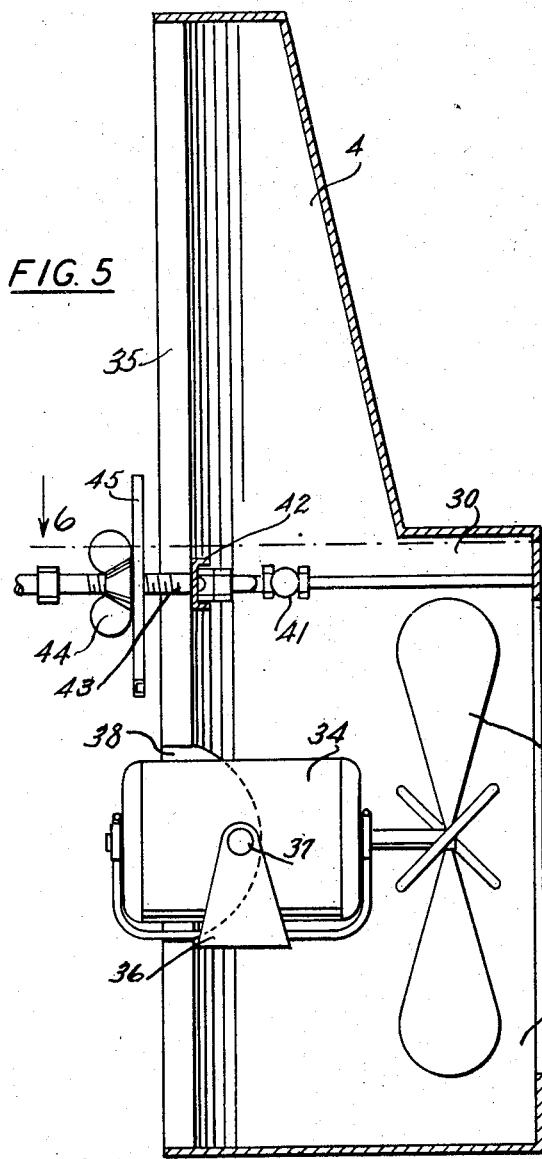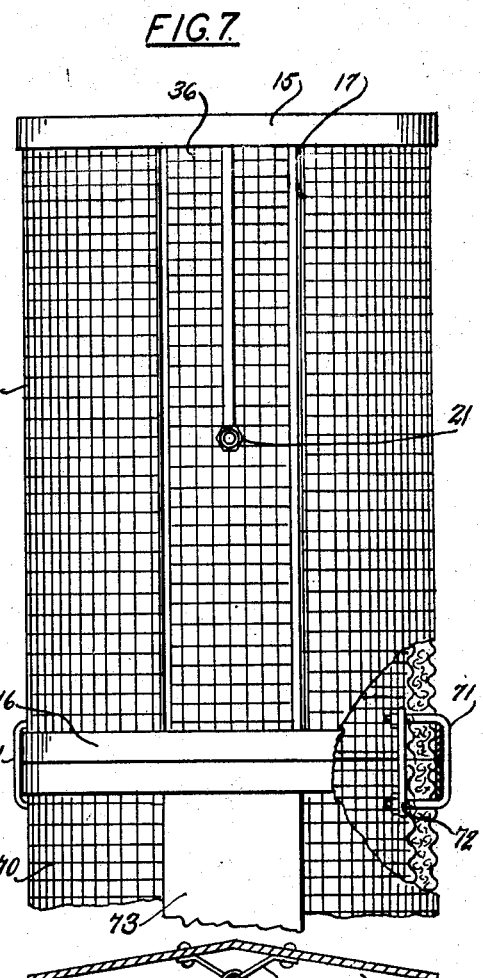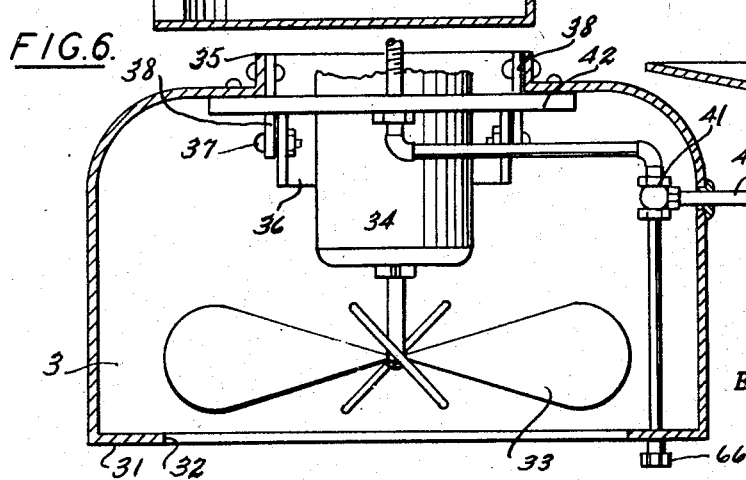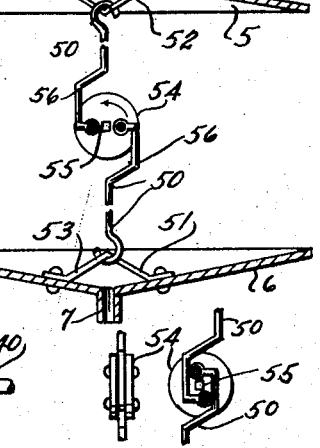

Jan. 16, 1940.  C. W. DE MUND ET AL  2,187,019
EVAPORATIVE AIR COOLER
Filed Sept. 7, 1938  3 Sheets-Sheet 3

INVENTOR.
Charles W. DeMund and
Lester D. DeMund
BY Scott L. Norviel
ATTORNEY

Patented Jan. 16, 1940

2,187,019

UNITED STATES PATENT OFFICE 2,187,019

EVAPORATIVE AIR COOLER

Charles W. De Mund and Lester D. De Mund, Phoenix, Ariz.

Application September 7, 1938, Serial No. 228,724

9 Claims. (Cl. 261—30)

Our invention relates to improvements in evaporative air coolers of the window box type.

More particularly, the invention relates to improvements in the type of evaporative air cooler wherein air is drawn from outside the habitation to be cooled through a moistened pad of large area and is thence forced into the habitation.

Perhaps in no area in the United States has cooling, or refrigeration by the evaporation of water, been resorted to as much as in the semi-arid Southwest. Here during the summer the humidity is low and, unlike humid, sultry climates, water may be efficiently used to produce cooling or refrigeration as is desired by those interested in the development of human comfort. One of the first devices of this kind used by man was the Mexican olla, which was an unglazed earthen jug, filled with water and suspended in the shade where it would have access to natural air currents. Water within this vessel seeped through its unglazed walls and was evaporated on its surface with a consequent lowering of the temperature of the remaining water within. The use of this device may be traced as far back as the aborigines. With the coming of the pioneer, the evaporative food cooler came into existence. This was a framework having a pyramidal top over which burlap or similar fabric was stretched and kept moistened by a continuous drip at the top. This too, was set in the shade where it would have access to natural air currents and food, water, and the like, which it was desired to keep cool was set within its enclosure.

Later, with the advent of electrical power, fans, and the like, attempts were made to evaporate quantities of water within the rooms of the habitations by forcing the draft of the fan over moistened fabrics, screens, etc. These earliest devices employing motor mechanism to secure evaporation for the purpose of refrigeration met with little success due to the fact that when evaporation took place within a closed space humidity was increased so rapidly that the resultant somewhat cooled air was more unpleasant to the occupant than the original dry air, if kept in motion by fans.

The temperature of the air, together with its humidity as felt by occupants of the habitation to be cooled, was denominated "sensible temperature". It was found that there was a limit to which room air could be cooled by evaporation and still retain a satisfactory sensible temperature. More recently it was discovered that if outside dry air was brought in contact with a quantity or water either broken into a spray or residing on the surface of an evaporative pad and quickly evaporated, this dry air could be reduced in temperature without obtaining such excess humidity, and the sensible temperature of the air stream resulting was satisfactory for cooling rooms, dwellings and other habitations so long as there was a continuous draft of this air through the building and adequate means taken to assure its removal. The earliest form of this type of window box cooler consisted of a packing box in which a round hole was cut in the bottom to receive an electric fan, while an excelsior pad held in place by chicken wire covered the open top. This device was mounted in an open window and means were taken to secure constant moistening of the pad. Usually a garden hose was allowed to slowly run into a V-shaped trough with a perforated bottom at the top of the pad. These devices having proved to be practical, commercial development followed and with it came the need for a device which could be easily installed; which would work with economy both as to water and electric consumption; which could be easily turned on and off and adjusted; which could be easily serviced and repaired by uniform replaceable parts and which could be readily dismounted to be put away when not needed or put in convenient containers for commercial packing and transportation. The old packing box window cooler was to be supplanted by a commercial product in which the evaporation could be so controlled and adjusted that the maximum cooling with the lowest possible sensible temperature of air could be secured with a minimum increase in its humidity. The open window in which the packing box was set being a constant hazard due to burglaries, needed to be supplanted by a form of cooler easily attached to and detached from an opening in the dwelling but which could be made foolproof from without and when in place formed a locked permanent part of the dwelling.

With the foregoing in mind the objects of our invention are, first, to provide an evaporative air cooler having an improved means for moistening the evaporative pad;

Second, to provide such a device with an evaporative unit adapted to receive a fan box unit, both being of standard dimensions and interchangeable construction, whereby the combination may be adapted to various types of installation;

Third, to provide a device of the kind mentioned which is readily adaptable to increased capacity without changes in the dimension of the evaporative units or rearrangement of the moistened element;

Fourth, to provide a device of the kind described in which all attachment parts may be reached from the interior of the dwelling only, so that opening or removal cannot be done from the outside until interior portions have been disconnected;

Fifth, to provide a device of this type wherein means are provided to prevent the decay or putrification of organic matter on or in the evaporative element and thus prevent undesirable odors where the device is operated intermittently; and Sixth, to provide a device which may be easily and quickly dismantled and the parts thereof placed one within another to afford economical packing for shipment and transportation.

Other objects will appear hereinafter.

We attain these objects by means of the devices and particular type of construction illustrated in the accompanying drawings in which—

Figure 1 is a frontal view of the cooling device made according to and including our improvements;

Figure 2 is a side elevational view thereof;

Figure 3 is a top view thereof;

Figure 4 is a fragmentary side elevation, showing the adaption of the fan box to a different type of installation than that shown in Figure 2;

Figure 5 is a sectional side elevation of the fan box portion of our device drawn on a somewhat larger scale;

Figure 6 is a horizontal section thereof taken substantially on line 6—6, Figure 5;

Figure 7 is a front view, drawn on the original scale, of the evaporative element of our cooler with the fan box and top and bottom closures removed, showing particularly its adaptation to increased evaporative area by the attachment and coupling of additional evaporative units;

Figure 8 is a vertical sectional view of the top and bottom closing devices for the evaporative units;

Figure 9 is a vertical view of the closing latch as in closed position;

Figure 13:
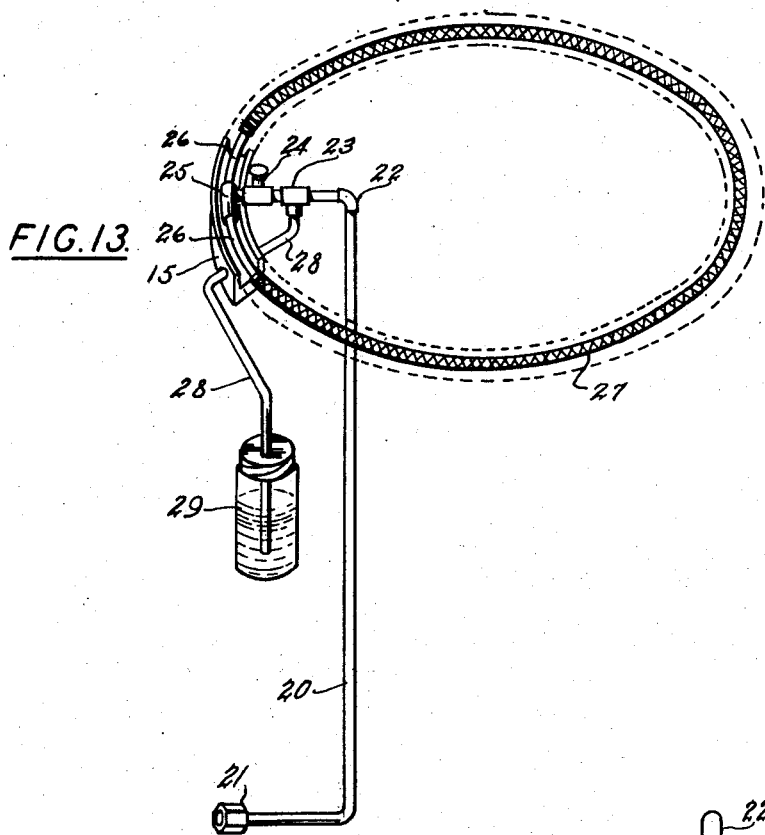
Figure 12:
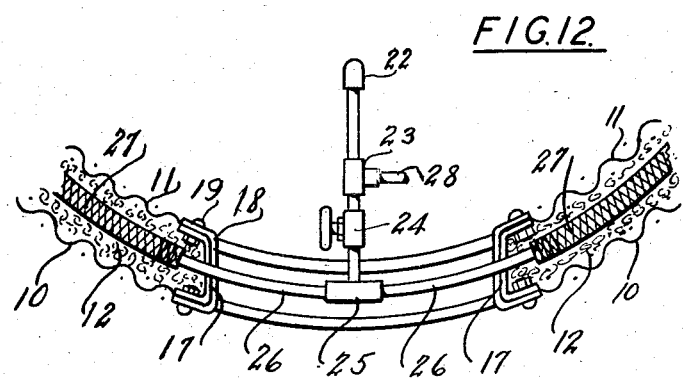

Figure 10, a transverse elevational view thereof;

Figure 11, a fragmentary sectional view of a top corner of the evaporating element, drawn on a larger scale, showing the details of the construction;

Figure 12 is a fragmentary plan view of the top of the evaporative element showing particularly the construction relative to the water feed pipe and water distributing element; and Figure 13 is a semi-diagrammatic perspective view of the water feed pipe and distributing system of the evaporative element, including the pad sterilizer.

Similar numbers refer to similar parts in the several views.

In general, our cooler is composed of a cylindrical evaporating element 2. to which is attached a fan box 3 having a transition piece or adaptor 4 shaped to fit within a rectangular vertical opening in the evaporative element and form an airtight connection therewith. The evaporative element is closed by a conical cover or lid 5 at the top and a drain pan 6 at the bottom. These are of identical shape except that the drain pan is provided with a nipple 7 adapted to receive a drain pipe or hose. These end closures are shaped to fit within the rims of end rings 8 and 9 surrounding the top and bottom respectively of end portions of the evaporative element. In further detail, the evaporative element consists of an outer cylindrically shaped screen 10 made of approximately one-half inch mesh hardware cloth, and inner screen 11, concentrically placed therewithin and made of the same material, and a continuous pad of packed excelsior 12 between these two screens. Within the rim of both the top and bottom screen a stiffening hoop 13 is attached by stiff binding wire secured at desired intervals. The rings 8 and 9 are secured by screws and washers and form an additional stiffening means. These are provided with an annular channel 14 to receive the edges of the top and bottom closures 5 and 6. For all ordinary purposes we have found that the pad of excelsior should be approximately 2 inches thick. As constructed, the inner screen is first rolled and secured in place to the hoops 13 at the top and bottom. Then ends are clamped within the vertical members 17 at the sides of the rectangular opening 36 of the evaporative element. The outer screen, then, having been cut to proper dimensions, is laid flat and a pad of damp excelsior placed thereon and compressed to a thickness of approximately 2 inches. When this excelsior has dried to the consistency of being damp only, the inner screen and its attendant framework is laid on the outer screen which is then rolled therearound. After this, the ends are secured between the nested channel bars 18 and 19 in a like manner as the inner screen. The two end rims are then secured in place by washers and metal screws driven from the inside. The two vertical frame members 17 are joined to an arcuately shaped block 15 at the top and a similarly shaped block 16 at the bottom. The pad and screens and frame pieces, so constructed, constitute the body of the evaporative element.

To this body is added the water supply system. This consists of the supply feed pipe 20 which commences with a ferrule fitting 21 at the bottom, extends upwardly to an elbow 22 from which it extends radially through a T 23 and a valve 24 to the center of a second T 25. The arms of T 25 carry feed pipes 26 extending outward from each side, and curved to follow approximately the center of the annular space between the inner and outer screens. To the ends of these short pipes a length of fabric hose 27 is attached. This hose forms a closed loop extending completely around the top of the annular space between the inner and outer screen and rests on the top of the excelsior pad therein. It constitutes our improved water feed means.

Heretofore, various methods of moistening the pad have been used, ordinarily consisting of a metal pipe extending along the top of the evaporative pad, whether this was straight, curved or otherwise, in which a plurality of holes were drilled along the lower side. In practice it has been found that if small closely spaced holes were used corrosion and sediment would fill some of them, stopping the flow at various points, with the result that the portion of the evaporation pad intended to be moistened by these particular holes would become dry and necessitating servicing the pipe by cleaning and redrilling the stopped holes. Since, after installation, the drain pipe is usually inaccessible this was both inconvenient and inefficient. We have found that when a feed pipe made as here described, consisting of a length of tubular untreated cotton fabric, having a weight approximately equivalent to that of 20 ounce canvas, used with water under a normal domestic supply pressure, this water will ooze through the body of the fabric in small droplets throughout its entire length. When this hose, or tube, is laid directly on top of the excelsior pad, as illustrated, this water is uniformly transmitted throughout the whole top of the evaporative pad and trickles and flows down through it in a uniform and highly satisfactory manner. It is well known that dry places in an evaporative pad cause inefficiency for when an area becomes dry the wood composing the excelsior shrinks, making the passage of air through it easier. This increased draft tends to further dry this dry area and the result is that an unwarranted amount of air is drawn through this particular area without being properly moistened. The attempt to offset this by further moistening other areas of the pad, in excess, has little effect in producing the uniform humidifying of the air as desired.

We have also found that a feed tube of this construction needs no servicing aside from replacement at long intervals since, due to the structure of the fabric, stoppage of holes is eliminated and the minute spaces between the threads of the fabric provide a myriad of small holes; the stoppage of any one being of small consequence. The valve 24 is placed on the inlet side of the T 25 to regulate the desired flow to be supplied to pad 12 and to provide a back pressure relative to that in tube 27 and the supply end of the feed line. This back pressure is tapped through T 25 and water led through a small copper tube 26, out through the block 15, to the outside of the evaporative element, and thence to close to the bottom of sterilizer bottle 29 accessibly situated and attached to a plate on the top of the fan box adapter. Within this bottle are crystals of a soluble salt the solution of which will destroy bacteria. It has been found that in operation dust particles from the air, insects, and the like, are drawn toward these evaporative pads and accumulate on its surface. After a time this accumulation is attacked by bacteria and putrifies. The result is that undesirable odors, which may be detrimental to health, are drawn from the pad into the room to be cooled. To prevent this, sterilizer 29 is provided. The construction is such that when pressure is supplied through feed pipe 20, a back pressure is created through valve 24 so that water enters sterilizer bottle 28 so long as pressure is supplied from the main shut off valve (hereinafter described). This water rises to a level in the bottle where the compression of the air contained in it balances this back pressure. So long as the device is running it is not necessary to supply this sterilizing solution, but when the device is shut down and dries out somewhat, bacterial growth is quite rapid. In view of this, when the water supply is turned off the compressed air in the bottle 28 forces out the liquid contained therein, and this is, in turn, forced out through the feed tube 27. This water contained in bottle 28 has, in the meantime, dissolved a portion of the salts placed in it and this solution is distributed evenly throughout the evaporation pad while it is still moist. It has been found that a very little of this solution, thus supplied, is adequate to counteract undesirable bacterial growths. The crystals in bottle 28 may consist of any suitable substance such as potassium permanganate, or the like.

Considering next the fan box and its adaption compartment, it will be noticed that there is, first, a practically square box portion 30 forming a housing and having an inner face 31 provided with a circular opening 32 just behind which a fan 33 operates when driven by motor 34. The vertical sides of this box are rounded at the rear and extended at the top into the transition piece or adaption portion 4 which is provided with a rectangular fitting rim 35 at the rear, sized to fit within the rectangular opening 36 in the evaporation element to form an air tight joint.

It will be noted that the lip 35 which fits into the rectangular opening 36 in the pad is symmetrical. Therefore, the entire fan box 3 may be turned end for end. Since the water supply feed line is primarily attached to this fan box its face always extends into the room where used, and its position of attachment between the fan box and the evaporative element is at the exact center of opening 36. The water supply feed line enters the fan box as indicated by numeral 40, passing through a main or shut off valve 41 then curves inwardly at this central position where a long threaded nipple 43 passes through a cross bar 42 to which it is secured by lock nuts. Thence it extends inwardly toward the evaporative element, terminating in a collar adapted to receive the coupling 21, likewise centrally positioned. The neck portion of this feed pipe as it extends outward from the fan box is threaded to receive wing nut 44 to permit operation throughout a considerable distance. This wing nut controls the tie or clamp bar 45, which is made of a length of channel iron drilled at its center. This tie bar constitutes the only means necessary to secure the fan box portion 3 to the evaporative portion 2 of the cooler. In Figure 5, it is shown at an angular position. When the fan box lip 35 is inserted into the opening 36 of the evaporative element this tie bar is turned horizontal so that its ends engage the inner sides of the vertical bars 17 framing opening 36. Wing nut 44 is then screwed down on the tie bar so that the evaporative element is drawn to the fan box unit, and an air tight connection is effected. This construction easily lends itself to mounting and dismounting the cooling unit on the fan box unit as well as to the end for end shifting of the latter to permit installation in either the upper or lower frames of windows as shown in Figures 2 and 4 respectively. Fragments of the window frame 39 are shown to indicate the relative position of the fan box therein. Wing nut 44 can be easily reached and operated through one of the open ends of the evaporative portion.

As illustrated in Figures 1, 2 and 5, the square portion of this fan box is at the bottom and the motor 34 rests in a stirrup 36 swung on pintle bolts 37 attached to inwardly extending supports 38. The axis of pintle bolts 37 is transverse to but on the same horizontal plane as the axis of the motor shaft and is identical with the center of the box housing portion 3. When the position of box 3 is turned end for end, as in Figure 4, the motor supporting stirrup is turned over and the motor set thereon without further adjustment.

The ends of the evaporative element are closed by the conically shaped lid and pan, above mentioned. In order to hold the lid down and the pan up we provide a novel structure consisting of the hook rods 50 and 51 made of somewhat resilient steel bar, having hooks at their outer ends adapted to engage stirrups 52 and 53 on the inner faces of these end pieces respectively. The inner ends of these rods are bent to extend inwardly at right angles and terminate in eyes, which bear upon pins extending through a spool 54. These eyes are adapted to turn on their supporting pins, the axes of which are diametrically opposite through the center of the spool. The length of hook rods 50 is such that when the top and bottom closures are first set into position the spool 54 will assume the position shown in Figure 8. The spool is shown in section in Figures 8 and 9 to show the positions of these pins. A tool having a square shank is then inserted in the squared center opening 55 of the spool and is turned in this case in a counterclockwise direction as indicated by the arrow, until the spool assumes the position shown in Figure 9. This operation tends to shorten the combined length of the hook rods so that the top and bottom closures are drawn together where they remain depending on the resiliency of the bent or curved portions 56 of these rods and the fact that the cross pins are turned beyond dead center. This operation is done after all other parts of the cooler have been set into the window, or other opening in the wall of the dwelling structure, and can be accomplished very easily from the inside with a tool of the nature described. There are no outward projections which will permit opening of the cooler from the outside and it therefore can not be tampered with nor opened from the outside without considerable difficulty.

For ordinary purposes a single evaporative unit is sufficient for each installation. However, where a greater volume of air is needed a fan having greater air propelling power may be installed and driven by a larger capacity motor. When this is done it may be desirable to add additional evaporative area to unit 2. Rather than make this larger, it has been found efficient to use another unit of similar size and shape, connecting this to the bottom of the first unit, as shown particularly in Figure 7. The top of the second unit indicated by 70 is joined to the bottom of the original unit 2 and held in place by the U-bolts 71 and plates 72. The rectangular opening 36 of the lower unit 70 is closed by a plate 73 and an additional length is added to hook rods 50 so that the lower rod will reach to the bottom of a pan closing the bottom of the lower additional unit 70. Installation thereafter is the same. It has been found that an installation of this type will operate efficiently from one water supply tube at the top; the opening of the supply valve 41 being proportionately greater.

While it has been thought expedient to describe the operation of the several elements of our improved cooler hereinabove, the following will give a better understanding as to its general installation and operation:

In installation the fan box 4 is inserted through a window or other opening in the wall of the dwelling to be cooled. It is clamped in place or otherwise securely attached to the portions of this wall or windowsill, as indicated by numerals 39. Water supply pipe 40 is connected to a source of water supply under pressure. The supply pressure is not critical since the valve 24 can regulate the pressure within all working limits. The motor 34 is then attached to stirrup 30 and the pintle bolts 37 tightened to secure it in line position in front of opening 32. Electrical connections leading from the fan (not shown since their connections are well known and obvious) may be led out through the box and be controlled by a knob switch 65, conveniently situated near the knob 66, which controls valve 41 through an elongated stem. Both are conveniently placed on the face 31 of the fan box. The cooling unit with the ends removed is then placed in position on the flange lip 35 of the fan box and the tie bar 45 adjusted as above described and tightened by wing nut 44. The end closures are then placed in position and then drawn up tight by the locking mechanism shown in Figures 8, 9 and 10. A hose, or other drain pipe, is attached to the nipple 7. The fan is then set in operation and the water supply opened by operation of the valve 41. Prior to this, pressure valve 24 has been set at a predetermined opening to create sufficient back pressure to operate the flow of water into and out from sterilizer bottle 28. This bottle is now partially filled with crystals of a salt, as above described, and screwed into the lid portion which is affixed to the side of the fan box. The device is then ready for operation.

When it is necessary to dismantle and change the device, this process is reversed and, after the detachment of the cooling unit and box from the window, it will be noted that there is ample room within the cylindrical cooling unit 2 to receive the fan box together with its adaption portion 4; this is indicated by the dotted outline 76, in Figure 2.

Other portions of the device may be included within this cylindrical evaporator and the entire device thus dismantled included within a simple carton packing box, no crating being necessary. Therefore, it will be seen that a construction of this type readily adapts itself to efficient dismantling and packing since there are no projecting parts requiring additional crating. This feature is important when commercial installations are to be packed and transported. The device as a whole is, however, very practical from a commercial aspect. All parts are easily accessible and removable when servicing is necessary. The device adapts itself to various installations without the use of tools being necessary, and increased capacity can be obtained from one standard sized evaporative unit.

Having now fully described our device and explained its use and operation:

We claim:

1. An evaporative cooler comprising a cylindrical evaporative element, having a longitudinally extending rectangular opening, a transition piece adapted to fit within the rectangular opening in said evaporative element in such a manner that said fan box may be turned end for end relative to said evaporative element, a fan box element attached near one end of said transition piece.

2. An evaporative air cooler comprising a cylindrical evaporative element having a rectangular longitudinal opening, a fan box attached to a transition piece, a transition piece adapted to fit within the rectangular opening in said evaporative element, means for detachably holding said transition piece in place in said evaporative element, conical closures for the top and bottom of said evaporative element, and means for latching said top and bottom closures in place contained within said evaporative element body and accessible from said fan box.

3. In an evaporative air cooler a cylindrical evaporative element consisting of concentrically positioned screens with an evaporative pad of absorptive material therebetween, a portion of said cylindrical circumference being removed to provide a rectangular longitudinally extending opening, stiffening rings attached to the outside of the ends of said outer screen, stiffening hoops attached to the inside of the ends of the inner screen, vertical members framing the sides of said opening composed of nested channel pieces adapted to retain the longitudinal ends of said screens between their adjacent edges and arcuately shaped blocks attached to the ends of said vertical members forming end closures for said rectangular opening.

4. An evaporative air cooler having a cylindrically shaped evaporative element with a longitudinal opening therein, a fan housing box adapted to attachment to an opening in the wall of the habitation to be cooled, built integral with a transition piece adapted to form an air tight joint within said rectangular opening, said fan housing box portion being positioned near one end of said transition piece portion, a water feed line extending through said fan box and into said evaporative element, means for attaching said fan box to said evaporative element including a portion of said water feed pipe centrally positioned relative to said rectangular opening, extending radially toward the axis of said evaporative element, and threaded to receive a wing nut operative to clampably secure cross bars extending laterally of said rectangular opening and engaging the longitudinal edges of the header and evaporative element respectively.

5. An evaporative air cooler having a cylindrically shaped evaporative element including an evaporative pad with a longitudinal opening therein, a fan housing box having a transition piece adapted to fit within said rectangular opening whereby said fan box may be turned end for end relative to said evaporative element to accommodate said fan box to different installations, means for detachably joining said evaporative element to said fan box transition piece, means for closing the ends of said evaporative element and providing a drain, a motor mount within said transition adapted to secure an electric motor in operative position in either of two end for end positions of said fan box, an electric motor with fan operably attached, affixed to said motor mount, a water supply pipe including a control valve operative from the front face of said fan box adapted to supply water to a distributing tube, and a distributing tube adapted to moisten the evaporative pad within said evaporative element consisting of a length of fabric tubing joined at both ends to said water supply pipe and positioned on the top of said evaporative pad.

6. In an evaporative cooler of the type disclosed, in combination, an evaporative element having a cylindrical shape, provided with a rectangular opening adapted to receive the transition piece of a fan box unit, a fan box unit including a transition piece adapted to fit within said rectangular opening in said evaporative unit whereby said unit may be turned end for end to accommodate different installations, a fan operatively mounted in said fan box unit and means for mounting said fan therein so that mounting may be provided for said fan when said fan box is turned end for end.

7. In an evaporative air cooler, of the type described, having a vertically positioned evaporating element, including an evaporating pad, a water supply pipe, and mechanism for drawing air through said pad and forcing it where desired, means for uniformly moistening said pad including, a porous fabric tube attached to said water supply pipe and extending along the top of said evaporative pad, adapted to distribute water thereto.

8. In an evaporative air cooler, of the type described, having a vertically positioned evaporating element, including an evaporating pad, a water supply pipe, and mechanism for drawing air through said pad and forcing it where desired, a Y-shaped fitting having its stem attached to said water supply pipe and a porous tube shaped to substantially form a loop, the ends thereof being attached to the prongs of said Y-shaped fitting, respectively, and positioned on and along the top of said evaporative pad.

9. An evaporative air cooler, of the type described, including in combination, a plurality of vertically positioned substantially cylindrical evaporative element units, having evaporative pads, attached in superposed position, a fan box including a fan operative therein having a rectangular transition piece fitted into the side of one of said units, a lid adapted to close the top of the uppermost of said units, a pan having a drain adapted to close the bottom of the lowermost of said units and means for moistening the evaporative pads of said evaporative element units, including an annular porous tube extending around and positioned above the topmost evaporative pad, a water supply pipe, and a regulating valve adapted for connection to a source of water supply.

CHARLES W. DE MUND.
LESTER D. DE MUND.